(12) United States Patent
Zhang et al.

(10) Patent No.: US 8,373,349 B2
(45) Date of Patent: Feb. 12, 2013

(54) CIRCUIT AND METHOD FOR STRIKING CCFL

(75) Inventors: Junming Zhang, Hangzhou (CN); Jiali Cai, Hangzhou (CN); Lei Du, Hangzhou (CN); Yuancheng Ren, Hangzhou (CN); Eric Yang, Saratoga, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 291 days.

(21) Appl. No.: 12/764,830

(22) Filed: Apr. 21, 2010

(65) Prior Publication Data

US 2010/0270937 A1 Oct. 28, 2010

(30) Foreign Application Priority Data

Apr. 22, 2009 (CN) .......................... 2009 1 0301741

(51) Int. Cl.
*H05B 41/16* (2006.01)

(52) U.S. Cl. ......... 315/224; 315/246; 315/247; 315/307

(58) Field of Classification Search ................... 315/247, 315/224, 291, 209 R, 200 R, 94, 307, 106, 315/112, 116, 276, 266, 254, 246
See application file for complete search history.

(56) References Cited

U.S. PATENT DOCUMENTS

| | | | | |
|---|---|---|---|---|
| 5,914,571 | A * | 6/1999 | Beasley | 315/244 |
| 6,252,357 | B1 * | 6/2001 | Tanaka et al. | 315/209 R |
| 6,590,350 | B1 * | 7/2003 | Tyson | 315/291 |
| 7,834,552 | B2 * | 11/2010 | Feldtkeller et al. | 315/94 |

* cited by examiner

*Primary Examiner* — Vibol Tan
(74) *Attorney, Agent, or Firm* — Perkins Coie LLP

(57) ABSTRACT

A circuit for controlling the switch frequency of an inverter that strikes and drives fluorescent lamps is disclosed. The circuit comprises a frequency generator and an offset circuit. The offset circuit provides a current signal in response to the lamp status. The frequency generator provides a frequency control signal in respond to the current signal so as to control the switch frequency of the inverter. When the lamp is open, the switch frequency of the inverter is higher; when the lamp is lighted, the switch frequency of the inverter is lower.

19 Claims, 4 Drawing Sheets

CIRCUIT AND METHOD FOR STRIKING CCFL

CROSS-REFERENCE TO RELATED APPLICATIONS

This application claims priority to and the benefit of Chinese Patent Application No. 200910301741.2, filed Apr. 22, 2009, which is incorporated herein by reference in its entirety.

TECHNICAL FIELD

The technology relates generally to electronic circuits, and more particularly, to inverters used to drive lamps.

BACKGROUND

A cold cathode fluorescent lamp (CCFL) has terminal voltage characteristics that depending upon the immediate history and the frequency of a signal (AC signal) applied to the lamp. Until the lamp is lit, the lamp will not conduct a current with an applied terminal voltage that is less than the strike voltage. Once an electrical arc is struck inside the lamp, the terminal voltage may fall to a run voltage that is approximately ⅓ of the strike voltage over a relatively wide range of input currents, as shown in FIG. 1.

Curve 1 in FIG. 1 represents a frequency-gain relation of an inverter when the lamp has been lit, while curve 2 represents the frequency-gain relation when the lamp is not lit. Generally, the quasi-resonant frequency $f_{s0}$ of curve 1 is chosen to be the operating switch frequency of the inverter, so that the inverter has a large gain $G_1$ when the lamp is in normal operation. However, as shown in FIG. 1, if the switch frequency is $f_{s0}$, the gain of the inverter of curve 2 is $G_2$, which is far lower than its maximum gain. Accordingly, the lamp may not be ignited.

In order to overcome the above disadvantage, prior art inverters choose a quasi-resonant frequency $f_{open0}$ of curve 2 as its switch frequency when the lamp is being lit, such that the inverter has a large gain $G_3$. After a predetermined time period, the inverter chooses the quasi-resonant frequency $f_{s0}$ of curve 1 as its switch frequency. However, the predetermined time period may be not long enough, so that the lamp may not be entirely ignited. Alternatively, the predetermined time period may last too long, so that the inverter still operates under a switch frequency $f_{open0}$ even if the lamp has been lit, causing the lamp to be extinguished due to a low gain of the inverter.

DETAILED DESCRIPTION

In the description that follows, the scope of the term "an embodiment" is not to be limited to as to mean more than one embodiment, bur rather, the scope may include one embodiment, more than one embodiment, or perhaps all embodiments.

Figure 1:
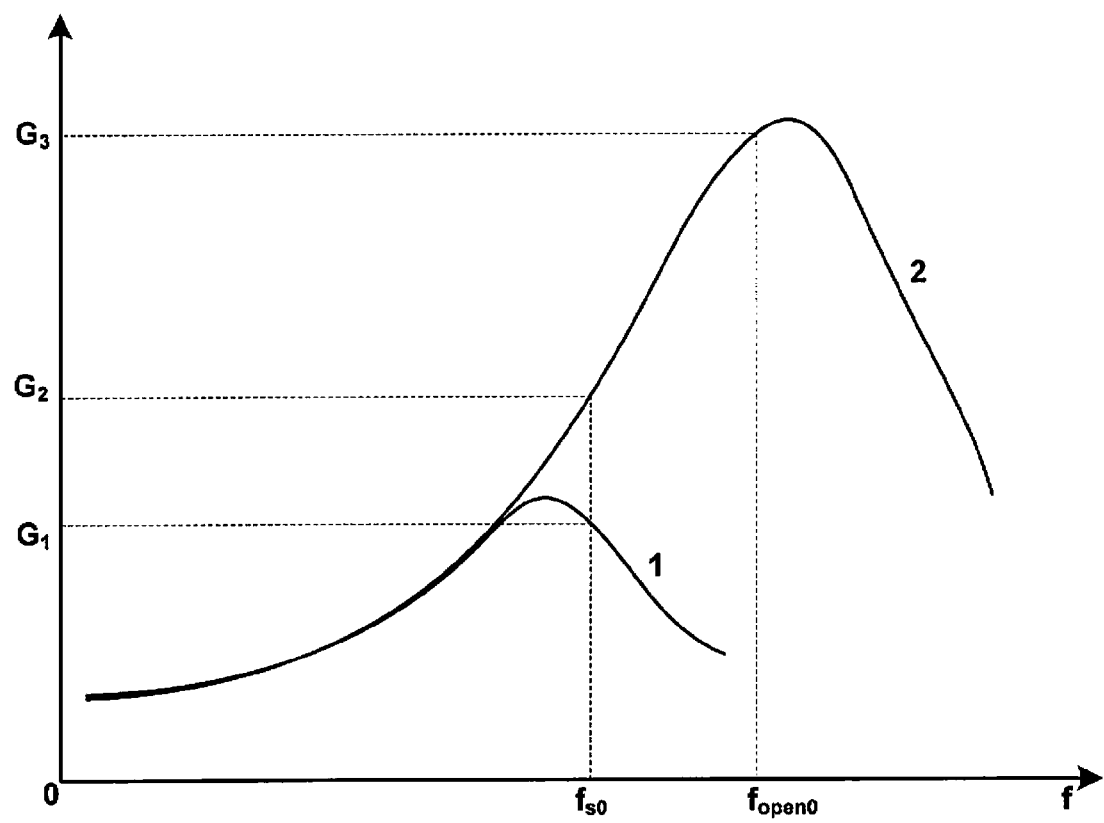
FIG. 1 illustrates frequency-gain curves of an inverter used to drive lamps.
Figure 2:
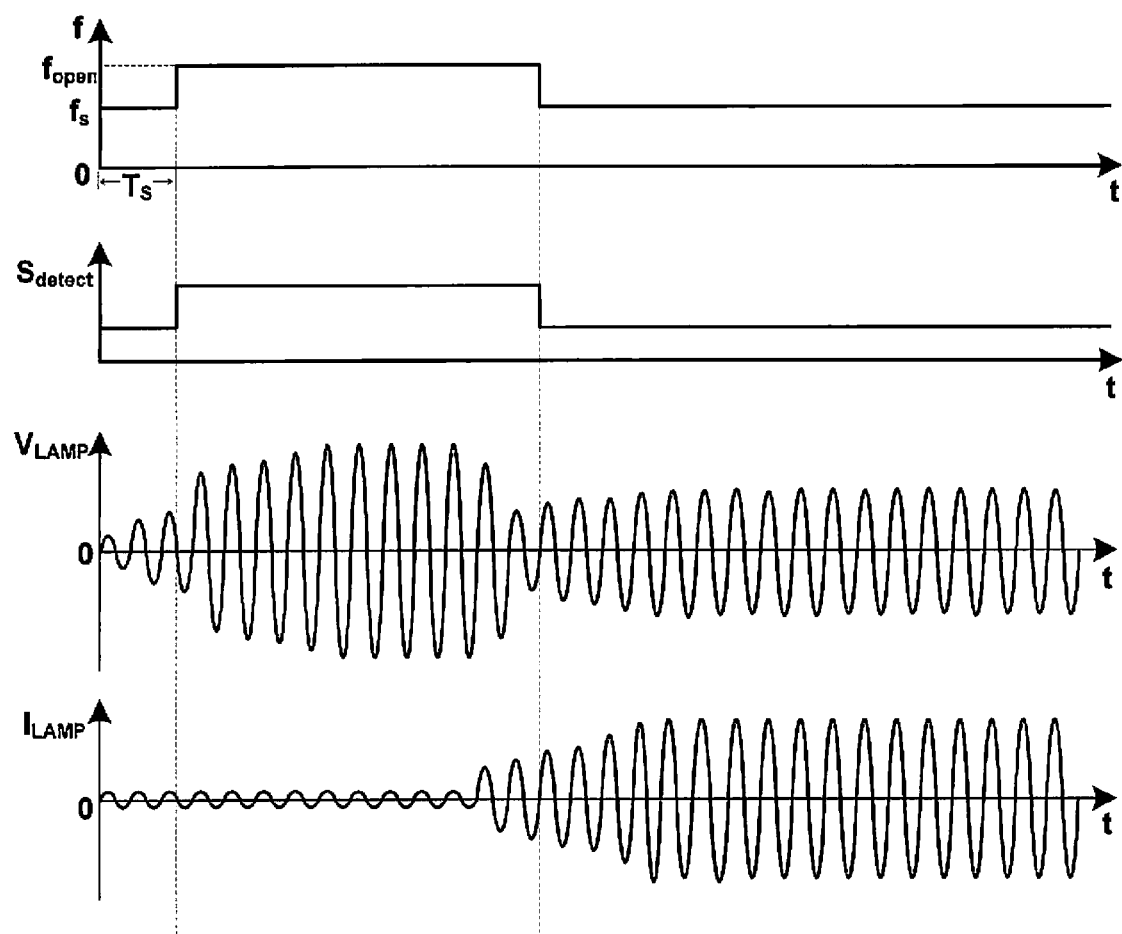
FIG. 2 illustrates a desired operation of an inverter which is used to drive lamps in accordance with an embodiment of the present invention.

FIG. 2 illustrates a desired operation of an inverter which is used to drive lamps in accordance with an embodiment of the present invention. Referring to FIG. 2, the inverter operates at a switch frequency $f_s$ at start-up. After a time period of $T_S$, the switch frequency f of the inverter jumps to an ignition frequency $f_{open}$, so as to increase the gain of the inverter to ignite the lamp. When the lamp is lighted, the switch frequency f of the inverter jumps back to its normal operation switch frequency $f_s$. The transition of the switch frequency of the inverter is realized by a lamp status detecting signal $S_{detect}$ through detecting the lamp current $I_{LAMP}$. Specifically, if the lamp current $I_{LAMP}$ is detected to be zero or lower than a predetermined value for the time period $T_S$, the lamp status detecting signal $S_{detect}$ indicates that the lamp is open. Accordingly, the switch frequency f of the inverter jumps to the ignition frequency $f_{open}$. However, if the lamp current $I_{LAMP}$ is detected to be a normal operation value, the lamp status detecting signal $S_{detect}$ indicates that the lamp is lit. Accordingly, the switch frequency of the inverter jumps to its normal operation switch frequency $f_s$. The waveforms of the switch frequency f of the inverter, the lamp status detecting signal $S_{detect}$, the voltage across the lamp $V_{LAMP}$, and the lamp current $I_{LAMP}$ are shown in FIG. 2.

Figure 3:
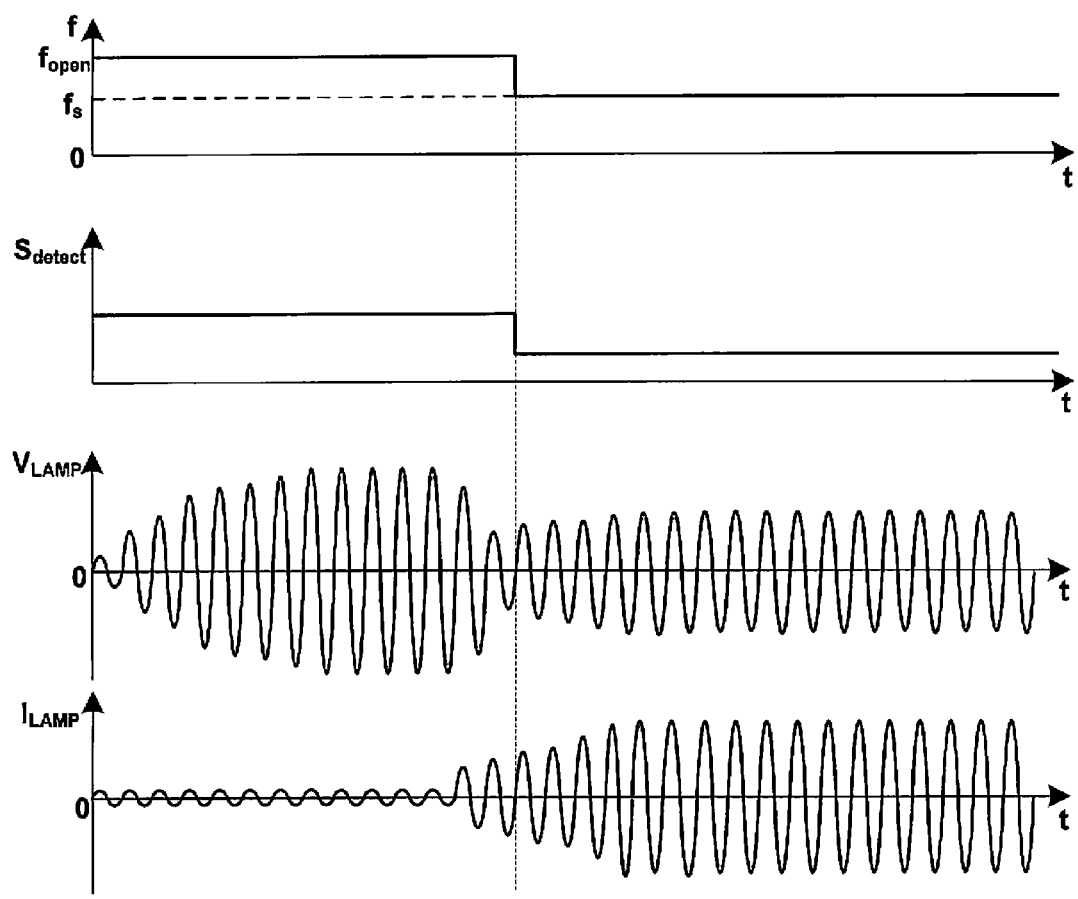
FIG. 3 illustrates a desired operation of an inverter which is used to drive lamps in accordance with another embodiment of the present invention.

FIG. 3 illustrates a desired operation of an inverter which is used to drive lamps in accordance with another embodiment of the present invention. Referring to FIG. 3, the inverter operates at an ignition frequency $f_{open}$ at start-up, so that the gain of the inverter is increased to ignite the lamp. When the lamp is lit, the switch frequency f of the inverter jumps to its normal operation switch frequency $f_s$. The transition of the switch frequency of the inverter is realized by a lamp status detecting signal $S_{detect}$ through detecting the lamp current $I_{LAMP}$. More generally, if the lamp current $I_{LAMP}$ is detected to be zero or lower than a predetermined value, the lamp status detecting signal $S_{detect}$ indicates that the lamp is open. Accordingly, the ignition frequency $f_{open}$ is set as the switch frequency f of the inverter. However, if the lamp current $I_{LAMP}$ is detected to be a normal operation value. The lamp status detecting signal $S_{detect}$ indicates that the lamp is lit. Accordingly, the switch frequency f of the inverter moves to its normal operation switch frequency $f_s$. The waveforms of the switch frequency f of the inverter, the lamp status detecting signal $S_{detect}$, the voltage across the lamp $V_{LAMP}$, and the lamp current $I_{LAMP}$ are shown in FIG. 3.

Figure 4:
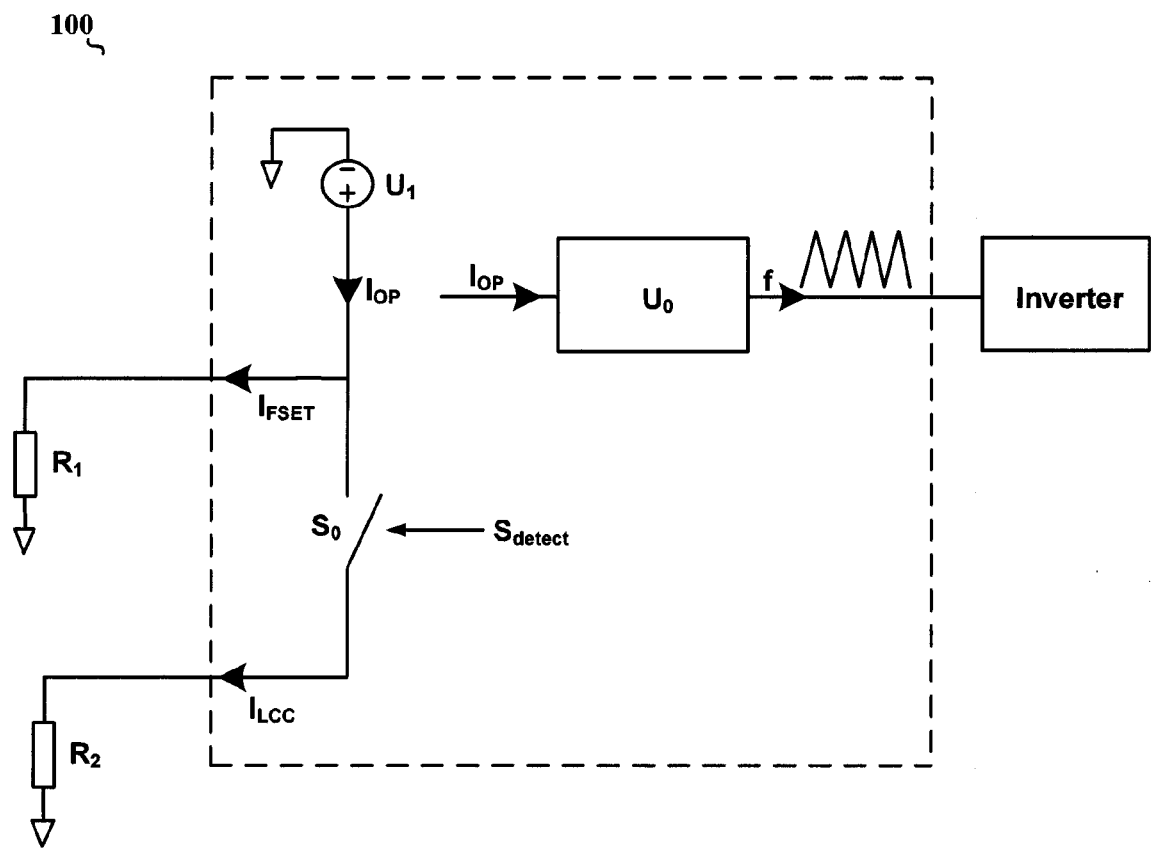
FIG. 4 illustrates a circuit 100 providing a frequency control signal which determines the switch frequency of the inverter in accordance with an embodiment of the present invention.

Referring to FIG. 4, a circuit 100 providing a frequency control signal which determines the switch frequency of the inverter in accordance with an embodiment of the present invention is shown. As shown in FIG. 4, circuit 100 comprises a frequency generator $U_0$ and an offset circuit which comprises a DC offset $U_1$, a first resistor $R_1$, a second resistor $R_2$, and a switch $S_0$. The frequency generator $U_0$ provides a frequency control signal which is used to control the switch frequency of the inverter in response to a current signal $I_{OP}$ flowing through the DC offset $U_1$. The larger the current signal $I_{OP}$ is, the higher the switch frequency f is.

The second resistor $R_2$ is coupled in series with the switch $S_0$. The series coupled resistor $R_2$ and the switch $S_0$ are coupled in parallel with the first resistor $R_1$, which is coupled in parallel with the DC offset $U_1$. The switch $S_0$ is controlled by the lamp status detecting signal $S_{detect}$. In one embodiment, if the lamp status detecting signal $S_{detect}$ is high, the switch $S_0$ is turned on; if the lamp status detecting signal $S_{detect}$ is low, the switch $S_0$ is turned off.

If the operation in FIG. 2 is desired, circuit 100 will operate as follows. When the lamp is not lit (i.e. open), the lamp current $I_{LAMP}$ is near zero. If this situation lasts for a time period $T_S$, the lamp status detecting signal $S_{detect}$ turns to high. Accordingly, the switch $S_0$ is turned on. As a result, the current signal $I_{OP}$ is equal to the current $I_{FET}$ flowing through the first resistor $R_1$ added with the current $I_{LCC}$ flowing through the second resistor. When the lamp is lighted, the lamp current $I_{LAMP}$ is large, and the lamp status detecting signal $S_{detect}$ turns to low. Accordingly, the switch $S_0$ is turned off. As a result, the current signal $I_{OP}$ is the current $I_{FET}$ flowing through the first resistor $R_1$.

If the operation in FIG. 3 is desired, circuit 100 will operate as follows. When the lamp is not lit (open), the lamp current $I_{LAMP}$ is near zero, and the lamp status detecting signal $S_{detect}$ turns to high immediately. Accordingly, the switch $S_0$ is turned on. As a result, the current signal $I_{OP}$ is equal to the current $I_{FET}$ flowing through the first resistor $R_1$ added with the current $I_{LCC}$ flowing through the second resistor. When the lamp is lighted, the lamp current $I_{LAMP}$ is large, and the lamp status detecting signal $S_{detect}$ turns to low. Accordingly, the switch $S_0$ is turned off. As a result, the current signal $I_{OP}$ is the current $I_{FET}$ flowing through the first resistor $R_1$.

Therefore, when the lamp is open, the current signal $I_{OP}$ is higher than that when the lamp is lit. As a result, the frequency generator $U_0$ provides a frequency control signal which causes the switch frequency f of the inverter to be equal to the ignition frequency $f_{open}$ when the lamp is open. The frequency generator $U_0$ provides the frequency control signal which causes the switch frequency f of the inverter to be equal to the normal operation frequency $f_s$ when the lamp is lit. Wherein the ignition frequency $f_{open}$ is corresponding to the quasi-resonant frequency $f_{open0}$ in curve 2, the normal operation switch frequency $f_s$ is corresponding to the quasi-resonant frequency $f_{s0}$ in curve 1. That is, $f_{s0}=f_{open0}$, $f_s=f_{s0}$.

This written description uses examples to disclose the invention, including the best mode, and also to enable a person skilled in the art to make and use the invention. The patentable scope of the invention may include other examples that occur to those skilled in the art.

We claim:

1. A circuit for igniting a lamp, comprising:
   a frequency generator, operable to provide a frequency control signal to control a switch frequency of an inverter, the frequency control signal responsive to a current signal; and
   an offset circuit, operable to provide the current signal indicative of the state of the lamp, wherein the offset circuit comprises a DC offset, a first resistor, a second resistor, and a switch, wherein:
   the DC offset provides the current signal;
   the DC offset is coupled in series with the second resistor and the switch; and
   the first resistor is coupled in parallel with the DC offset.

2. The circuit of claim 1, wherein the switch is controlled by a lamp status detecting signal.

3. The circuit of claim 2, wherein
   if the lamp current is zero or lower than a predetermined value, the lamp status detecting signal turns on the switch;
   if the lamp current is the normal operation value, the lamp status detecting signal turns off the switch.

4. The circuit of claim 2, wherein
   if the lamp current is zero or lower than a predetermined value for a predetermined time period, the lamp status detecting signal turns on the switch;
   if the lamp current is the normal operation value, the lamp status detecting signal turns off the switch.

5. The circuit of claim 1, wherein the resistance of the first resistor and the second resistor is adjustable.

6. The circuit of claim 1, wherein
   if the lamp current is zero or lower than a predetermined value, the current signal is relatively larger;
   if the lamp current is the normal operation value, the current signal is relatively smaller.

7. The circuit of claim 1, wherein
   if the lamp current is zero or lower than a predetermined value for a predetermined time period, the current signal is relatively larger;
   if the lamp current is the normal operation value, the current signal is relatively smaller.

8. A method used in an inverter for igniting a lamp, comprising:
   detecting the lamp current to get a lamp status detecting signal;
   if the lamp current is zero or lower than a predetermined value, the lamp status detecting signal turns on a switch, so as to cause the switch frequency of the inverter to jump to an ignition frequency;
   if the lamp current is the normal operation value, the lamp status detecting signal turns off the switch, so as to cause the switch frequency of the inverter to jump to a normal operation frequency; wherein
   the ignition frequency is higher than the normal operation frequency.

9. The method of claim 8, wherein the switch frequency is determined by a frequency control signal which is provided by a frequency generator in response to a current signal.

10. The method of claim 9, wherein
    if the switch is turned on, the current signal is higher, so that the frequency control signal causes the switch frequency to jump to the ignition frequency;
    if the switch is turned off, the current signal is lower, so that the frequency control signal causes the switch frequency to jump to the normal operation frequency.

11. The method of claim 9, wherein the switch is series coupled with a second resistor, the series coupled switch and resistor is further coupled with a first resistor and a DC offset in parallel.

12. The method of claim 11, wherein the current signal is the current flowing through the DC offset.

13. The method of claim 11, wherein the resistance of the first switch and the second switch is adjustable; by adjusting the resistance of the first resistor, the frequency generator generates variable frequency control signal, so as to cause the switch frequency of the inverter to jump to different normal operation frequency; by adjusting the resistance of the second resistor, the frequency generator generates variable frequency control signal, so as to cause the switch frequency of the inverter to jump to different ignition frequency.

14. A method used in an inverter for igniting a lamp, comprising:
    detecting a lamp current of the lamp to get a lamp status detecting signal;
    if the lamp current is zero or lower than a predetermined value for a predetermined time period, the lamp status detecting signal causes the switch frequency of the inverter to jump to an ignition frequency;
    if the lamp current is the normal operation value, the lamp status detecting signal causes the switch frequency of the inverter to jump to a normal operation frequency; wherein the ignition frequency is higher than the normal operation frequency.

15. The method of claim 14, wherein the switch frequency is determined by a frequency control signal which is provided by a frequency generator in response to a current signal.

16. The method of claim 15, wherein
if a switch is turned on, the current signal is higher, so that the frequency control signal causes the switch frequency to jump to the ignition frequency;
if the switch is turned off, the current signal is lower, so that the frequency control signal causes the switch frequency to jump to the normal operation frequency.

17. The method of claim 15, wherein a switch is series coupled with a second resistor, the series coupled switch and resistor is further coupled with a first resistor and a DC offset in parallel.

18. The method of claim 15, wherein the current signal is the current flowing through the DC offset.

19. The method of claim 15, wherein the resistance of the first switch and the second switch is adjustable, wherein
by adjusting the resistance of the first resistor, the frequency generator generates a variable frequency control signal that causes the switch frequency of the inverter to jump to a different normal operation frequency; and
by adjusting the resistance of the second resistor, the frequency generator generates a variable frequency control signal that causes the switch frequency of the inverter to jump to different ignition frequency.

* * * * *